(12) United States Patent
Gardner et al.

(10) Patent No.: US 12,436,055 B2
(45) Date of Patent: Oct. 7, 2025

(54) PRESSURE TRANSDUCER FOR USE IN CHARGED MEDIA

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US); Richard Martin, Ridgewood, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 310 days.

(21) Appl. No.: 18/314,204

(22) Filed: May 9, 2023

(65) Prior Publication Data

US 2024/0377275 A1    Nov. 14, 2024

(51) Int. Cl.
| | |
|---|---|
| *G01L 19/06* | (2006.01) |
| *G01L 13/02* | (2006.01) |
| *G01L 19/00* | (2006.01) |
| *G01L 19/14* | (2006.01) |

(52) U.S. Cl.
CPC ........ *G01L 19/0645* (2013.01); *G01L 13/025* (2013.01); *G01L 19/0084* (2013.01)

(58) Field of Classification Search
CPC ..... G01L 19/00; G01L 19/0084; G01L 19/04; G01L 19/06; G01L 19/0645; G01L 19/14; G01L 13/02; G01L 13/025
See application file for complete search history.

(56) References Cited

U.S. PATENT DOCUMENTS

| | | | |
|---|---|---|---|
| 7,000,478 B1 * | 2/2006 | Zwollo | G01L 19/148 73/708 |
| 7,152,477 B2 * | 12/2006 | Banholzer | G01L 19/0084 73/756 |
| 2015/0260599 A1 * | 9/2015 | Kurtz | G01L 9/06 73/717 |

* cited by examiner

*Primary Examiner* — Nguyen Q. Ha
(74) *Attorney, Agent, or Firm* — TROUTMAN PEPPER LOCKE LLP; James E. Schutz; Mark Lehi Jones

(57) ABSTRACT

A transducer assembly configured for use with electrically charged or conductive media. The transducer assembly includes a pressure header made from a first material, a pressure chip mounted to the pressure header, an adapter made from a second material and attached to the pressure header, and a non-conductive body coupled to the adapter. The non-conductive body includes an opening configured for accepting the adapter and for securing the pressure header, the pressure chip, and the adapter within the opening of the non-conductive body. The non-conductive body is made from a third material that is different than the first material and the second material

19 Claims, 4 Drawing Sheets

PRESSURE TRANSDUCER FOR USE IN CHARGED MEDIA

TECHNICAL FIELD

The disclosed technology relates to pressure transducers, and in particular, to systems and methods for a pressure transducer configured for use in charged and/or conductive pressure media.

BACKGROUND

A typical industrial pressure transducer is constructed with a body of stainless steel or other conductive metal. In most applications, this is advantageous because it allows for electrical shielding of the transducer, and the metallic body is resistant to temperature variation and other harsh environmental conditions. However, when the pressure media is conductive and/or electrically charged, for example, due to a voltage source somewhere else in the system, a conductive transducer body can provide a ground path for the pressure media and can result in measurement errors, unwanted current, and/or other related issues due to the lack of electrical isolation.

Previous pressure transducers have utilized a plastic housing and/or body for electrical isolation from the pressure media, however, a material mismatch between the housing/body material and the pressure sensing device can lead to poor performance of the pressure transducer. Typical pressure-sensing chips made of silicon or other semiconductor are designed to be mounted on materials that have similar thermal expansion coefficients. If the pressure sensing chips are mounted on other materials (such as plastics or aluminum) it can lead to poor performance due to the thermal expansion mismatch. To protect the sensing chips from conductive and corrosive media or to avoid shorting or early failure, a metal isolation diaphragm and an oil-fill cavity may be utilized to indirectly transmit pressure from the pressure media to the sensing chip, as is discussed in U.S. Pat. No. 5,999,082. However, the use of plastic or other non-conductive housing/body material can generally make it difficult (if not impossible) to hermetically seal such as an oil-filled transducer. A need exists for an improved transducer assembly configuration.

BRIEF SUMMARY

The disclosed technology includes a pressure transducer for use in conductive or charged media. In certain exemplary implementations, the body and/or housing of the pressure transducer can be made from a non-conductive material, such as hard anodized aluminum or plastic, and an adapter may be disposed between the pressure header and the non-conductive body to avoid thermal expansion mismatches, which can provide certain advantages over conventional designs.

According to an example implementation, a transducer assembly configuration is disclosed for use with electrically charged or conductive media, the transducer assembly includes a pressure header made from a first material, a pressure chip mounted to the pressure header, an adapter made from a second material and attached to the pressure header, and a non-conductive body coupled to the adapter. The non-conductive body includes an opening configured for accepting the adapter and for securing the pressure header, the pressure chip, and the adapter within the opening of the non-conductive body. The non-conductive body is made from a third material that is different than the first material and the second material.

A method is disclosed for assembling a transducer assembly for use in conductive or charged media. A method of assembling a transducer assembly for use in conductive or charged media, the method includes providing a pressure header made from a first material, mounting a pressure chip to the pressure header, providing an adapter made from a second material, attaching the pressure header to the adapter, providing a non-conductive body having an opening configured for accepting the adapter, and inserting the adapter into the opening. The non-conductive body is made from a third material that is different than the first material and the second material.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
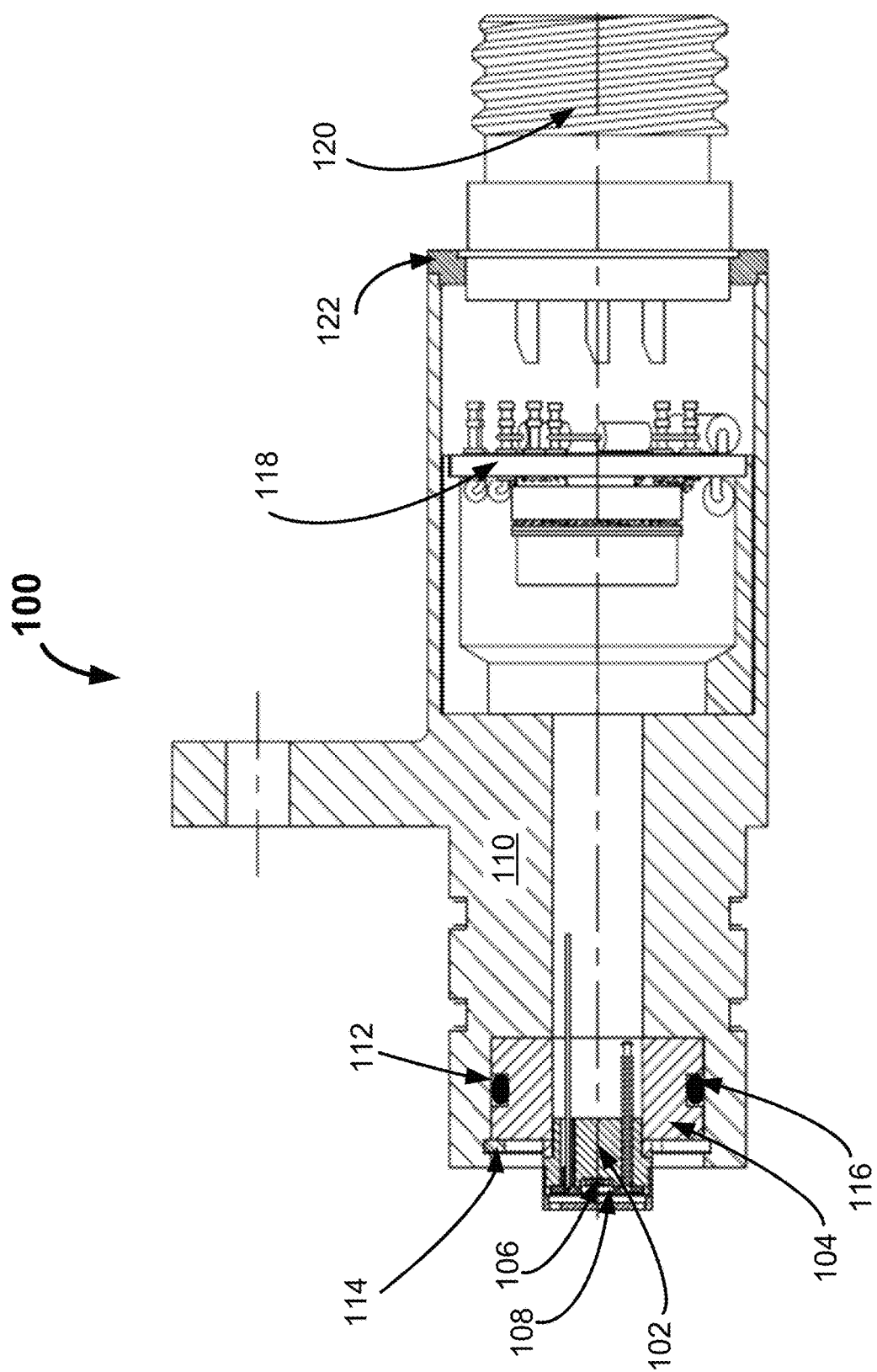
FIG. 1 depicts a pressure transducer assembly 100 in accordance with certain exemplary implementations of the disclosed technology.

Although many embodiments of the disclosed technology are explained in detail, it is to be understood that other embodiments are contemplated. Accordingly, it is not intended for the disclosed technology to be limited in scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

Referring now to the figures, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may be desirable and/or required for implementation. However, because such elements are well-known in the art, and because they do not facilitate a better understanding of the disclosed technology, a discussion of such elements is not provided herein.

The disclosed technology allows for various levels of electrical isolation of a pressure transducer while still incorporating a metal outer body or shell, enabling the use of the pressure transducer for a wide variety of applications and allowing a wide variety of materials to be used for the construction of the pressure capsule.

The disclosed technology includes a pressure transducer configuration that can be used to measure pressure media that is electrically charged and/or conductive. Certain exemplary implementations of the disclosed technology provide electrical isolation from the pressure media to avoid conducting charge or current from the pressure media through the body of the transducer for example, by utilizing a transducer body made from a non-conductive material such as hard anodized Aluminum or plastic. In certain exemplary implementations, the non-conductive body of the disclosed pressure transducer may be further protected by a housing or outer sleeve using material such as stainless steel that is also electrically isolated from the non-conductive body.

FIG. 1 depicts a pressure transducer assembly 100 having a non-conductive body 110, in accordance with certain exemplary implementations of the disclosed technology. The pressure transducer assembly 100 can include a pressure header 102 made of stainless steel or other conductive materials. A pressure transducer chip 106 may be mounted to the pressure header 102. In certain exemplary implementations, the pressure header 102 may include an oil-filled cavity 108 disposed in front of a pressure transducer chip 106 (as will be further discussed below with reference to FIG. 2). In certain exemplary implementations, the pressure header 102 may be the same or similar to the pressure headers discussed in U.S. Pat. No. 9,182,308, assigned to Kulite Semiconductor Products Inc., and incorporated herein by reference as if presented in full.

In accordance with certain exemplary implementations of the disclosed technology, the pressure header 102 may be welded into an adapter 104 that is also made of stainless steel or other conductive material (like the pressure header 102). In certain exemplary implementations, the pressure header 102 and the adapter 104 may be made from a material having the same or similar thermal coefficient of expansion (TCE), for example, so that temperature changes and associated thermal-related stresses on the pressure transducer assembly 100 do not adversely impact the pressure transducer chip 106 measurements. In at least this respect, the disclosed technology can provide improvements over previous electrically isolated transducer configurations.

In certain exemplary implementations, the adapter 104 can include an O-ring groove 112 around its circumference that is configured for securing an O-ring 116 between the adapter 104 and the non-conductive body 110. The adapter 104 (with the attached pressure header 102 and pressure transducer chip 106) may be pushed into an opening on the front portion of the non-conductive body 110, and a retaining ring 114 may be used to secure the adapter 104/pressure header 102/pressure transducer chip 106 sub-assembly to the non-conductive body 110. As will be discussed below with reference to FIGS. 3A-3C, the retaining ring 114 may be clipped-in, threaded-in, or pressed-in.

The O-ring 116 disposed in the O-ring groove 112 may provide a seal between the non-conductive body 110 and the adapter 104 such the pressure media does not leak into the inner body of the pressure transducer assembly 100. In accordance with certain implementations, and depending on the application, a second O-ring (not shown), for example, disposed in a second O-ring groove (not shown) around the adapter's 104 circumference may be used to further prevent leaks between the adapter 104 and the non-conductive body 110.

In accordance with certain exemplary implementations of the disclosed technology, electrical connections to the pressure transducer chip 106 may be made through the inner body of the pressure transducer assembly 100 to electronic circuitry 118, which may also be electrically isolated from pressure media and any conductive housing or shell of the pressure transducer assembly 100. In certain exemplary implementations, the electronic circuitry 118 can include galvanic and/or optical isolation components to further electrically isolate the pressure transducer assembly 100 while providing signals to/from external equipment.

In certain exemplary implementations, an electrical connector 120 may be electrically connected to the electronic circuitry 118 and may be utilized to interface with external equipment. In certain exemplary implementations, the electrical connector 120 can be electrically isolated from pressure media and any conductive housing or shell of the pressure transducer assembly 100 by using a plastic adapter 122 and/or by using non-conductive epoxy to secure the connector 120 to the non-conductive body 110 and/or to an outer body/shell of the pressure transducer assembly 100.

Figure 2:
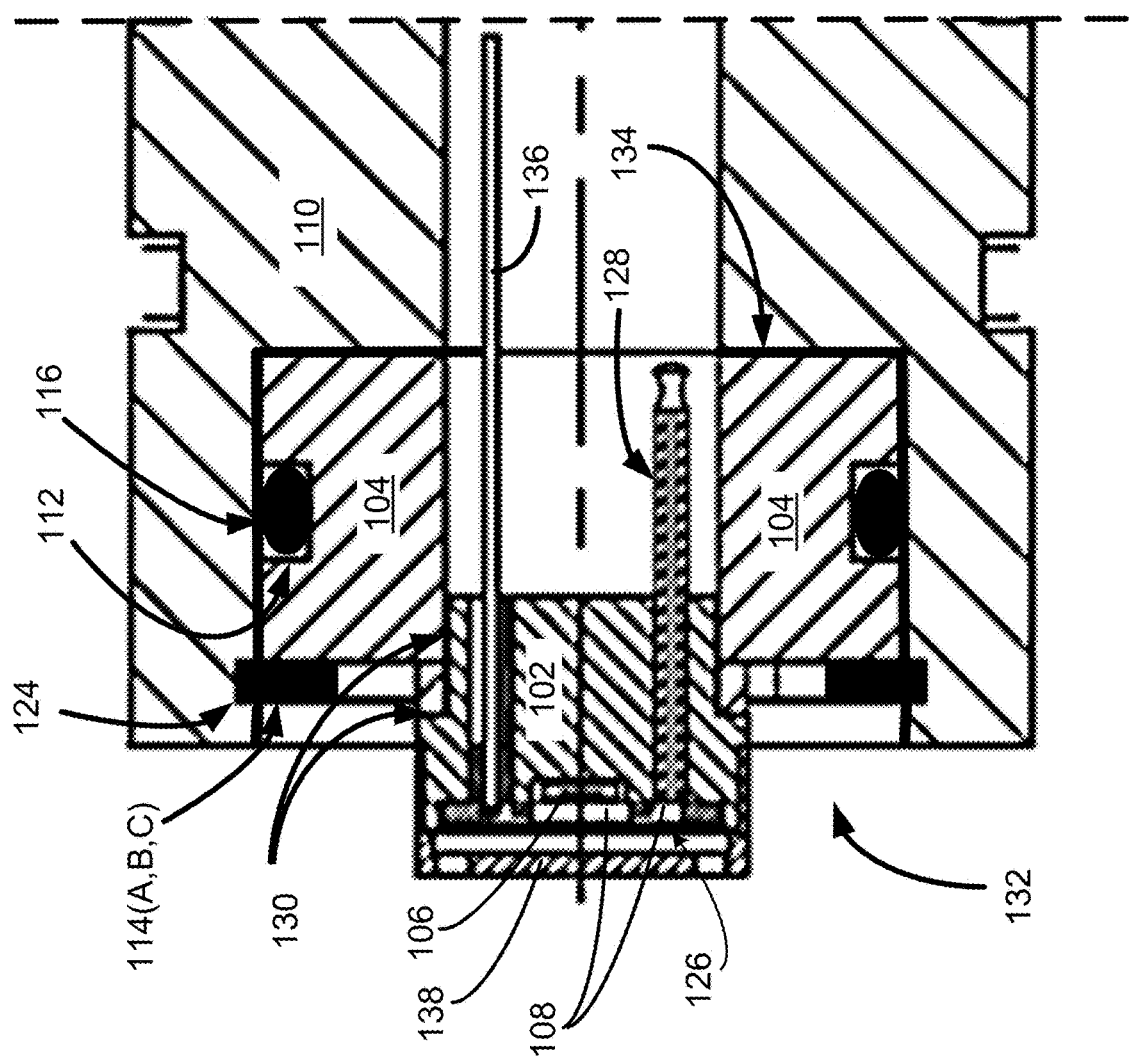
FIG. 2 illustrates an enlarged view of a front portion of the pressure transducer assembly as illustrated in FIG. 1 in accordance with certain implementations of the disclosed technology.

FIG. 2 illustrates an enlarged view of a front portion of the pressure transducer assembly 100 (as illustrated in FIG. 1). In accordance with certain exemplary implementations of the disclosed technology, an isolation diaphragm 126 may be welded to the pressure header 102 to define the oil-fill cavity 108, which may be filled using an oil-fill tube 128. In accordance with certain exemplary implementations of the disclosed technology, the isolation diaphragm 126 and the oil-fill cavity 108 may be utilized to transfer pressure from the pressure media to the pressure transducer chip 106 while protecting the pressure transducer chip 106 from the pressure media.

In certain exemplary implementations, a metal pin 136 may be utilized to route electrical connectors from the pressure transducer chip 106 to electrical circuitry (such as the electrical circuitry 118 as shown in FIG. 1).

In certain exemplary implementations, a protective screen 138 may be installed on the front portion of the header 102, for example, to protect the isolation diaphragm 126.

FIG. 2 illustrates portions of the interface between the pressure header 102 and the adapter 104 where these components may be joined using one or more welds 130, for example, to seal the interface between the pressure header 102 and the adapter 104 so that pressure media is not allowed to leak through the interface.

Also, as more clearly illustrated in FIG. 2, the non-conductive body 110 may have a notched and/or threaded retainer feature 124 defined in an inner circumference of the adapter opening 132 and configured for accepting a retaining ring 114 (which can be embodied as a clip, screw, or press-fit washer as will be discussed below). In certain exemplary implementations, the position of the retainer feature 124 may be configured so that the retaining ring 114, when installed, may cause the adapter 104 to press against a stop 134 of the opening 132 of the non-conductive body 110 so that the adapter is secured within the opening 132. In certain exemplary implementations, additional sealant or adhesive may be utilized at this stop 134 to further seal the adapter 104 and prevent pressure media from entering the internal body.

Figure 3A:
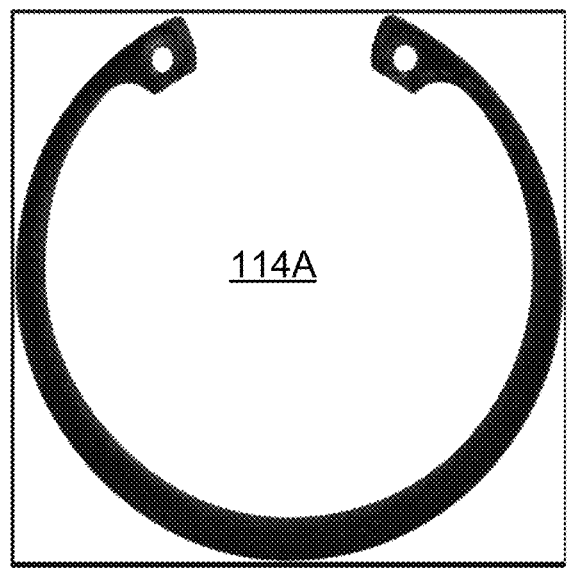
FIG. 3A illustrates a retaining ring clip embodiment for securing an adapter/header in an opening of a non-conductive body of the pressure transducer assembly, in accordance with certain exemplary implementations of the disclosed technology.
Figure 3B:
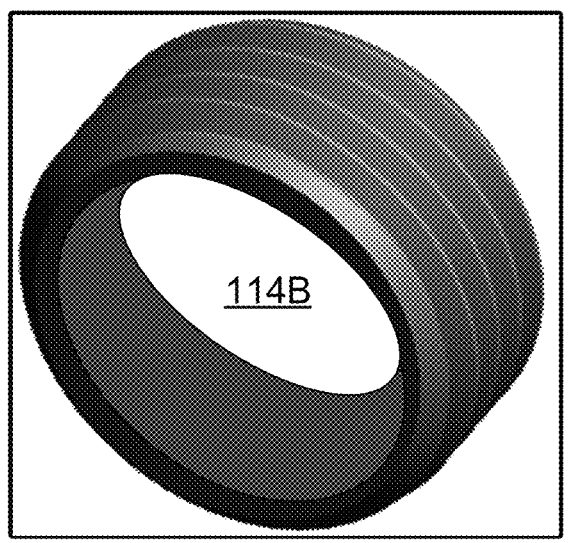
FIG. 3B illustrates a retaining ring screw embodiment for securing an adapter/header in an opening of a non-conductive body of the pressure transducer assembly, in accordance with certain exemplary implementations of the disclosed technology.
Figure 3C:
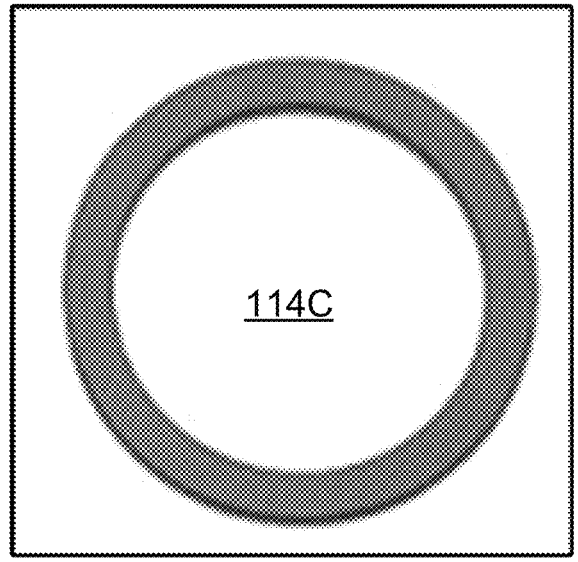
FIG. 3C illustrates a retaining ring press-fit washer embodiment for securing an adapter/header in an opening of a non-conductive body of the pressure transducer assembly, in accordance with certain exemplary implementations of the disclosed technology.

FIGS. 3A-3C illustrates various retaining ring embodiments 114A, 114B, and 114C that may be installed in the retainer feature (for example, in the retainer feature 124 as shown in FIG. 2).

FIG. 3A illustrates a retaining ring clip 114A embodiment for securing the adapter/header in the opening of the non-conductive body of the pressure transducer assembly, in accordance with certain exemplary implementations of the disclosed technology. In this embodiment, a ring clip compression tool may be used to compress the ring clip 114A while it is inserted into the opening 132. Thereafter, the ring clip 114A may be pushed in to automatically expand and engage with the (notch-type) retainer feature 124 to secure the adapter 104 within the opening 132.

FIG. 3B illustrates a retaining ring screw 114B embodiment for securing the adapter/header in the opening of the non-conductive body of the pressure transducer assembly, in accordance with certain exemplary implementations of the disclosed technology. In this embodiment, a tool such as a flat-blade screwdriver may be used to screw the ring screw 114B into corresponding threads defined in the opening 132 to secure the adapter 104 within the opening 132.

FIG. 3C illustrates a retaining ring press-fit washer 114C embodiment for securing the adapter/header in the opening of the non-conductive body of the pressure transducer assembly, in accordance with certain exemplary implementations of the disclosed technology. In this embodiment, a cylindrical tool may be used to press the ring press-fit washer 114C into the opening 132 to secure the adapter 104 within the opening 132. In this example implementation, the press fit washer 114C may be slightly oversized so that, when pressed into the opening 132, it secures the adapter 104 within the opening 132 without requiring a notch or screw feature. In this embodiment, the feature 124 may simply be a portion of the wall of the opening 132 defined in the non-conductive body 110. Furthermore, in this embodiment, by pressing the press-fit washer 114C into the opening with sufficient force, it may slightly deform the wall of the opening 132 to make its own retention notch as the retainer feature 124.

Various other methods of securing the adapter 104 within the opening 132 may be used without departing from the scope of the disclosed technology.

Figure 4:
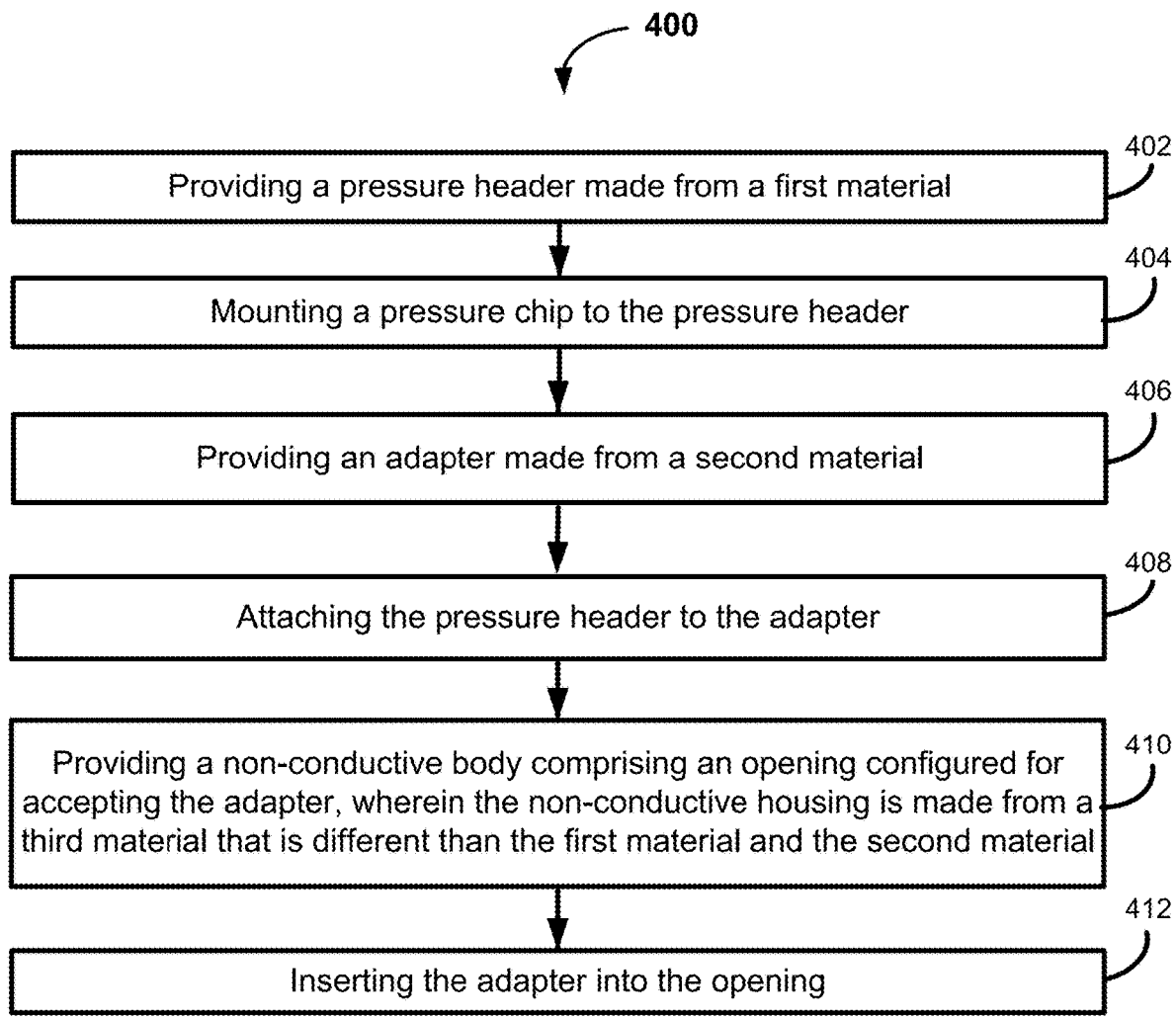
FIG. 4 illustrates a method 400 of assembling a pressure transducer assembly for use in conductive or charged media, in accordance with certain implementations of the disclosed technology.

FIG. 4 illustrates a method 400 of assembling a pressure transducer assembly for use in conductive or charged media, in accordance with certain implementations of the disclosed technology. In block 402, the method 400 includes providing a pressure header made from a first material. In block 404, the method 400 includes mounting a pressure chip to the pressure header. In block 406, the method 400 includes providing an adapter made from a second material. In block 408, the method 400 includes attaching the pressure header to the adapter. In block 410, the method 400 includes providing a non-conductive body comprising an opening configured for accepting the adapter, wherein the non-conductive housing is made from a third material that is different than the first material and the second material. In block 412, the method 400 includes inserting the adapter into the opening.

Certain exemplary implementations of the disclosed technology can include installing a retaining ring in the retaining ring acceptance feature to secure the adapter within the opening.

In certain exemplary implementations, the adapter comprises an O-ring groove around its circumference. The O-ring groove may be configured for accepting an O-ring.

Certain exemplary implementations can include disposing an O-ring in the O-ring groove, wherein the O-ring is configured to be compressed between the adapter and the non-conductive body to prevent the passage of pressure media.

In certain exemplary implementations, the first material of the pressure header and the second material of the adapter may be the same or similar material. In certain exemplary implementations, the first material of the pressure header and the second material of the adapter may be different materials.

In certain exemplary implementations, the first material of the pressure header and the second material of the adapter may comprise stainless steel.

Certain exemplary implementations can include connecting electronic circuitry to the pressure chip. The electronic circuitry may be electrically isolated from the pressure header and the adapter. In certain exemplary implementations, the electronic circuitry may be galvanically isolated from the body of the transducer. In certain exemplary implementations, the electronic circuitry may be optically isolated from the body of the transducer.

Certain exemplary implementations can include attaching an electrical connector to the housing and/or shell. The electrical connector may be electrically isolated from the pressure header and the adapter. The electrical connector may be characterized by a non-conductive body portion (such as plastic) with conductive pins there through. Certain exemplary implementations can include electrically connecting the conductive pins to the electronic circuitry. The non-conductive body may be electrically isolated from the housing/shell. In some embodiments, the electrical connector is plastic.

In certain implementations, the pressure header and the adapter may be electrically conductive.

Certain exemplary implementations can include welding the adapter to the pressure header. In certain exemplary implementations, the pressure header and/or the adapter can comprise stainless steel.

Certain exemplary implementations of the disclosed technology can include disposing an oil-fill cavity at the front surface of the header in communication with the pressure chip. Certain exemplary implementations can further include welding an isolation diaphragm to a surface of the header for communication with the oil fill cavity.

In accordance with certain exemplary implementations of the disclosed technology, the opening of the non-conductive body can include a retaining ring acceptance feature. Certain exemplary implementations of the disclosed technology can include installing a retaining ring in the retaining ring acceptance feature, wherein installing the retaining ring comprises threading, clipping, or pressing the retaining ring into the retaining ring acceptance feature.

In accordance with certain exemplary implementations of the disclosed technology, installing a retaining ring in the retaining ring acceptance feature can include threading, clipping, or pressing the retaining ring into the acceptance feature.

In certain exemplary implementations, a backup or second O-ring may be used to prevent leaks.

According to certain example implementations, a transducer assembly is disclosed for measuring one or more parameters or properties associated with the measurement medium. The transducer assembly may be configured to measure pressure associated with the measurement medium. For example, in one illustrative implementation, the transducer assembly may be configured to measure the dynamic and/or static oil pressure within a machine.

As used in the specification and the appended claims, the singular forms "a," "an," and "the" include plural referents unless the context clearly dictates otherwise. Also, in describing the preferred embodiments, certain terminology has been utilized for the sake of clarity. It is intended that each term contemplates its broadest meaning as understood by those skilled in the art and includes all technical equivalents which operate in a similar manner to accomplish a similar purpose.

As used herein, the terms "comprising" "containing" or "including" mean that at least the named element or method step is present in the composition or article, or method, but does not exclude the presence of other compounds, materials, particles, method steps, even if the other such compounds, material, particles, method steps have the same function as what is named.

Numerous characteristics and advantages have been outlined in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as outlined in the following claims. Therefore, other modifications or embodiments as may be suggested by the teachings herein are particularly reserved as they fall within the breadth and scope of the claims here appended.

The invention claimed is:

1. A transducer assembly for use with electrically charged or conductive media, the transducer assembly comprising:
   a pressure header made from a first material;
   a pressure chip mounted to the pressure header;
   an adapter made from a second material which may be the same as or different than the first material, wherein the adapter is welded to the pressure header; and
   an electrically non-conductive body coupled to the adapter, the non-conductive body comprising an opening configured for accepting the adapter and for securing the pressure header, pressure chip, and adapter within the opening of the non-conductive body, wherein the non-conductive body is made from a third material that is different than the first material and the second material.

2. The transducer assembly of claim 1, wherein the adapter comprises an O-ring groove around its circumference, wherein the O-ring groove is configured for accepting an O-ring.

3. The transducer assembly of claim 2, further comprising an O-ring disposed in the O-ring groove, wherein the O-ring is configured to be compressed between the adapter and the non-conductive body to prevent passage of pressure media.

4. The transducer assembly of claim 1, further comprising:
   a retaining ring acceptance feature in an inner circumference of the opening; and
   a retaining ring disposed in the retaining ring acceptance feature and configured for securing the pressure header, pressure chip, and adapter within the opening of the non-conductive body; wherein the retaining ring is threaded, clipped, or pressed into the retaining ring acceptance feature.

5. The transducer assembly of claim 1, wherein the pressure header is electrically conductive.

6. The transducer assembly of claim 1, wherein one or more of the first material of the pressure header and second material of the adapter comprises stainless steel.

7. The transducer assembly of claim 1, further comprising an oil fill cavity disposed at a front surface of the pressure header.

8. The transducer assembly of claim 7, further comprising an isolation diaphragm mounted to a front surface of the pressure header and in communication with the oil fill cavity.

9. The transducer assembly of claim 1, further comprising electronic circuitry connected to the pressure chip, wherein the electronic circuitry is electrically isolated from the pressure header and the adapter.

10. The transducer assembly of claim 9 further comprising an electrical connector having a non-conductive body and conductive pins therethrough that are electrically connected to the electronic circuitry, wherein the non-conductive body is electrically isolated from the pressure header and the adapter.

11. A method of assembling a transducer assembly for use in conductive or charged media, the method comprising:
   providing a pressure header made from a first material;
   mounting a pressure chip to the pressure header;
   providing an adapter made from a second material which may be the same as or different than the first material;
   welding the pressure header to the adapter;
   providing an electrically non-conductive body comprising an opening configured for accepting the adapter, wherein the non-conductive body is made from a third material that is different than the first material and the second material; and
   inserting the adapter into the opening.

12. The method of claim 11, wherein the adapter comprises an O-ring groove around its circumference, wherein the O-ring groove is configured for accepting an O-ring, and further comprising disposing an O-ring in the O-ring groove, wherein the O-ring is configured to be compressed between the adapter and the non-conductive body to prevent passage of pressure media.

13. The method of claim 11, further comprising connecting electronic circuitry to the pressure chip, wherein the electronic circuitry is electrically isolated from the pressure header and the adapter.

14. The method of claim 13 further comprising attaching an electrical connector to the non-conductive body, wherein the electrical connector is characterized by a non-conductive body and conductive pins there through.

15. The method of claim 14, further comprising electrically connecting the conductive pins to the electronic circuitry, wherein the non-conductive body is electrically isolated from the non-conductive body.

16. The method of claim 11, wherein the pressure header and the adapter are electrically conductive.

17. The method of claim 11, wherein one or more of the first material of the pressure header and the second material of the adapter comprise stainless steel.

18. The method of claim 11, further comprising disposing an oil fill cavity at a front surface of the pressure header in communication with the pressure chip and welding an isolation diaphragm to a surface of the pressure header for communication with the oil fill cavity.

19. The method of claim 11, wherein the opening of the non-conductive body comprises a retaining ring acceptance feature, and further comprising installing a retaining ring in the retaining ring acceptance feature, wherein installing the retaining ring comprises threading, clipping, or pressing the retaining ring into the retaining ring acceptance feature.

* * * * *